United States Patent
Park (10) Patent No.: US 9,941,742 B2
(45) Date of Patent: Apr. 10, 2018

(54) WIRELESS POWER TRANSMISSION APPARATUS AND WIRELESS POWER TRANSMISSION METHOD

(71) Applicant: LG INNOTEK CO., LTD., Seoul (KR)

(72) Inventor: Su Bin Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 229 days.

(21) Appl. No.: 15/044,751

(22) Filed: Feb. 16, 2016

(65) Prior Publication Data

US 2016/0241085 A1 Aug. 18, 2016

(30) Foreign Application Priority Data

Feb. 16, 2015 (KR) .................. 10-2015-0023224

(51) Int. Cl.
*H02J 50/10* (2016.01)
*H02J 50/80* (2016.01)

(52) U.S. Cl.
CPC .............. *H02J 50/10* (2016.02); *H02J 50/80* (2016.02)

(58) Field of Classification Search
CPC ............ H02J 50/10; H02J 50/60; H02J 50/80
See application file for complete search history.

(56) References Cited

FOREIGN PATENT DOCUMENTS

| JP | 2013-172640 A | 9/2013 |
|---|---|---|
| KR | 10-2012-0047027 A | 5/2012 |
| KR | 10-2014-0007273 A | 1/2014 |
| KR | 10-2014-0138389 A | 12/2014 |

*Primary Examiner* — Robert Deberadinis
(74) *Attorney, Agent, or Firm* — Birch, Stewart, Kolasch & Birch, LLP (57) ABSTRACT

A wireless power transmission apparatus for wirelessly transmitting power to a wireless power reception apparatus includes a first wireless power transmission module configured to wirelessly transmit power using a first method, a second wireless power transmission module configured to wirelessly transmit power using a second method, and a controller configured to control the first wireless power transmission module and the second wireless power transmission module. The first wireless power transmission module includes a first signal transmission unit configured to transmit a first signal for detecting the wireless power reception apparatus, a second signal transmission unit configured to transmit a second signal for determining whether the detected wireless power reception apparatus is capable of receiving power transmitted using the first method and a reception unit configured to receive a signal from the wireless power reception apparatus.

20 Claims, 7 Drawing Sheets

WIRELESS POWER TRANSMISSION APPARATUS AND WIRELESS POWER TRANSMISSION METHOD

CROSS REFERENCE TO RELATED APPLICATION

This application claims priority under 35 U.S.C. § 119 to Korean Patent Application No. 10-2015-0023224, filed in Korea on 16 Feb. 2015 which is hereby incorporated in its entirety by reference as if fully set forth herein.

TECHNICAL FIELD

Embodiments relate to a wireless power transmission apparatus and a wireless power transmission method and, more particularly, to an apparatus for wirelessly transmitting power to a terminal using different methods.

BACKGROUND

Recently, with development of information and communication technology, a society based on ubiquitous information and communication technology has been formed.

In order to connect information and communication apparatuses anywhere and at anytime, sensors each having a computer chip having a communication function should be installed in all social facilities. Accordingly, problems related to supply of power to such apparatuses or sensors have newly arisen. In addition, as portable apparatuses such as mobile phones, Bluetooth handsets and music players such as iPod have rapidly increased, it takes time and effort for a user to charge batteries. As a method for solving such a problem, recently, wireless power transmission technology is attracting considerable attention.

Wireless power transmission or wireless energy transfer technology refers to technology of wirelessly transmitting electric energy from a transmitter to a receiver using the principle of magnetic induction. In the 1800s, electrical motors or transformers using the principle of electromagnetic induction already started to be used and then methods of radiating radio waves or electromagnetic waves such as lasers and transmitting electric energy were also attempted. Commonly used electric toothbrushes or electric razors are charged using the principle of electromagnetic induction.

Up to now, a wireless energy transfer method may be roughly divided into a magnetic induction method, an electromagnetic resonance method and a power transmission method using a short-wavelength radio frequency.

The magnetic induction method refers to technology of using a phenomenon that, when two coils are adjacently placed and current is supplied to one coil, a magnetic flux is generated to generate electromotive force in the other coil, and is commercially available in small apparatuses such as mobile phones. The magnetic induction method may transmit power of a maximum of several kilowatts (kW) and has high efficiency. However, since a maximum transmission distance is 1 cm or less, an apparatus should be generally located to be adjacent to a charger.

The magnetic induction method uses an electric field or a magnetic field instead of electromagnetic waves or current. The magnetic induction method is hardly influenced by an electromagnetic wave and thus is harmless to other electronic apparatuses and humans. In contrast, the magnetic induction method may be used at a limited distance and in a limited space and energy transfer efficiency is slightly low.

The short-wavelength wireless power transmission method—briefly referred to as an RF method—uses a method of directly transmitting and receiving energy in the form of radio waves. This technology is an RF type wireless power transmission method using a rectenna. Rectenna means is a compound word of "antenna" and "rectifier" and means an element for directly converting RF power into direct current (DC) power. That is, the RF method is technology of converting AC radio waves into DC radio waves and using DC radio waves and, recently, research into commercialization thereof has been actively conducted as efficiency is improved.

Wireless power transmission technology may be variously used in IT, railroad and consumer-electronics in addition to the mobile industry.

The replacement cycle of a mobile terminal such as a mobile phone has been shortened and a user may not know using which method the terminal thereof wirelessly receives power. Accordingly, it takes time and effort for a user to check the wireless power reception method of the terminal thereof and to select a wireless power transmission apparatus. In addition, a wireless power transmission apparatus should be separately provided according to the wireless power reception method of the terminal.

SUMMARY

Embodiments provide a wireless power transmission apparatus for wirelessly transmitting power to a terminal using at least two methods.

In one embodiment, a wireless power transmission apparatus for wirelessly transmitting power to a wireless power reception apparatus includes a first wireless power transmission module configured to wirelessly transmit power using a first method, a second wireless power transmission module configured to wirelessly transmit power using a second method, and a controller configured to control the first wireless power transmission module and the second wireless power transmission module. The first wireless power transmission module includes a first signal transmission unit configured to transmit a first signal for detecting the wireless power reception apparatus, a second signal transmission unit configured to transmit a second signal for determining whether the detected wireless power reception apparatus is capable of receiving power transmitted using the first method and a reception unit configured to receive a signal from the wireless power reception apparatus.

The first method may be a magnetic resonance method.

The second method may be a magnetic induction resonance method.

The first signal transmission unit may transmit a short beacon and the second signal transmission unit may transmit a long beacon.

The reception unit may receive an advertisement (ADV) signal and determine whether the wireless power reception apparatus is a terminal capable of wirelessly receiving power using the first method.

The second wireless power transmission module may include a third signal transmission unit configured to transmit a third signal for detecting the wireless power reception apparatus, and the third signal transmission unit may transmit a digital ping.

The wireless power transmission apparatus may further include a third wireless power transmission module configured to wirelessly transmit power using a third method, and the third wireless power transmission module may include a fourth signal transmission unit configured to transmit a fourth signal for detecting the wireless power reception apparatus.

The second method may be a Power Matters Alliance (PMA) method and the third method may be a Wireless Power Consortium (WPC) method.

In another embodiment, a wireless power transmission method for wirelessly transmitting power includes transmitting a first signal in order to detect a wireless power reception apparatus, transmitting a second signal for determining whether the wireless power reception apparatus uses a first method, and transmitting a third signal for determining whether the wireless power reception apparatus uses a second method, when the wireless power reception apparatus does not use the first method.

The wireless power transmission method may further include wirelessly transmitting power using a second method, when the wireless power reception apparatus uses the second method.

The wireless power transmission method may further include transmitting a fourth signal for determining whether the wireless power reception apparatus uses a third method, when the wireless power reception apparatus does not use the second method.

The wireless power transmission method may further include wirelessly transmitting power using the third method when the wireless power reception apparatus uses the third method.

The first signal may be a short beacon and the second signal may be a long beacon.

The wireless power transmission method may further include receiving an advertisement (ADV) signal to determine whether the wireless power reception apparatus wirelessly receives power using the first method.

The third signal may be a digital ping.

The first method may be a magnetic resonance method and the second method may be a magnetic induction resonance method.

The first method may be an Alliance for Wireless Power (A4WP) method and the second method may be at least one of a Power Matters Alliance (PMA) method or a Wireless Power Consortium (WPC) method.

The third method may be a Wireless Power Consortium (WPC) method.

The fourth signal may be a digital ping.

The wireless power transmission method using the first method may have a wider charging area than that of the wireless power transmission method using the second method.

Less than 3 seconds may be taken from transmitting of the first signal to transmitting power using at least one of the first method, the second method or the third method.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the following description of the embodiments, for convenience of description, a wireless power transmission apparatus configuring a wireless power transmission system may be used interchangeably with a transmitter, a transmission end, a transmission apparatus, a transmission side, a power transmission apparatus, etc. In addition, for convenience of description, a wireless power reception apparatus may be used interchangeably with a receiver, a terminal, a reception side, a reception apparatus, a power reception apparatus, etc.

The transmitter according to the present invention may be configured in the form of a pad or a cradle. One transmitter may include a plurality of wireless power transmission units and wirelessly transmit power to a plurality of receivers.

Figure 1:
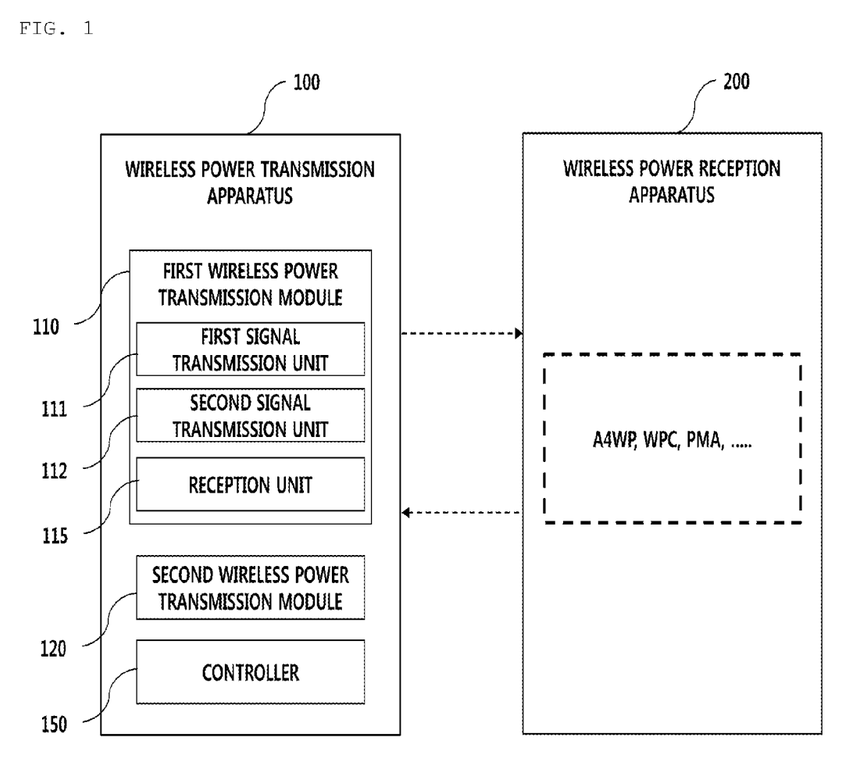
FIG. 1 is a diagram showing a first embodiment of wireless power transmission and reception apparatuses.
Figure 2:
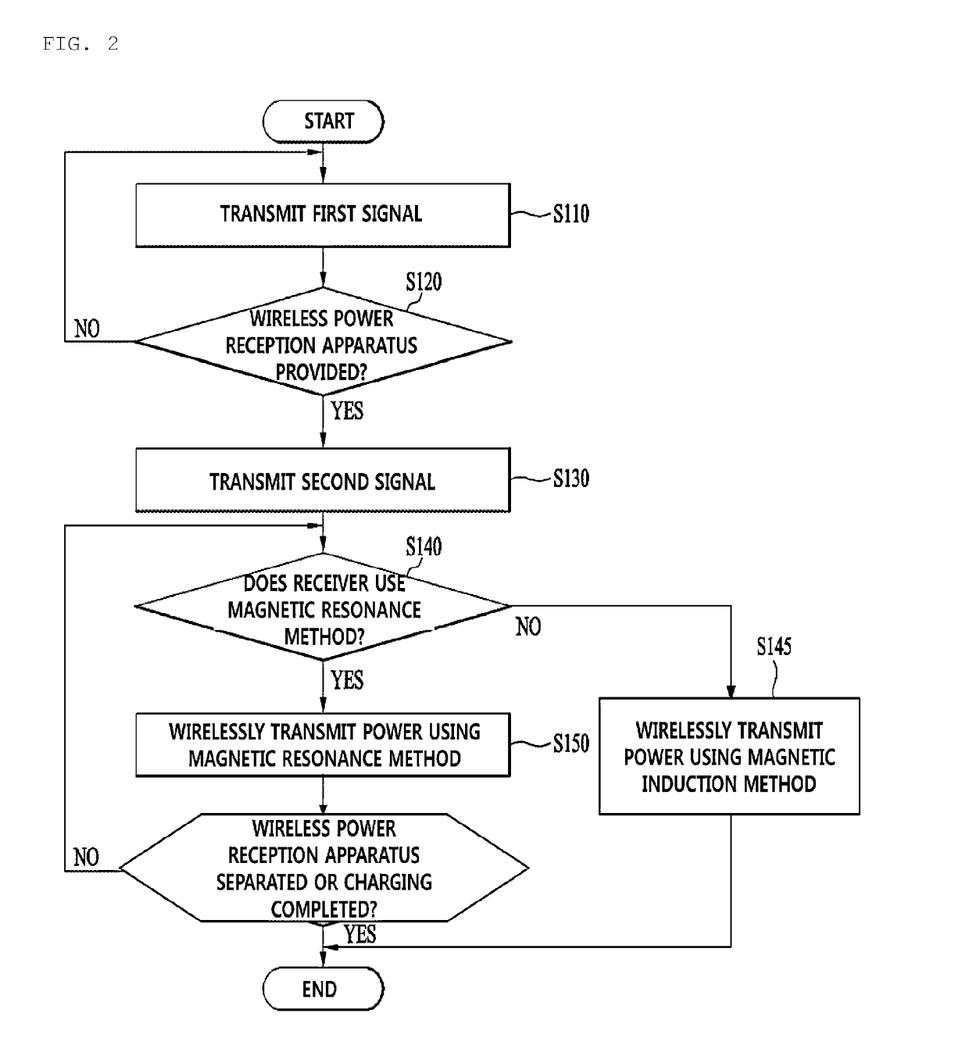
FIG. 2 is a flowchart illustrating wireless power transmission and reception executed in the wireless power transmission and reception apparatuses of FIG. 1.

FIG. 1 is a diagram showing a first embodiment of wireless power transmission and reception apparatuses, and FIG. 2 is a flowchart illustrating wireless power transmission and reception executed in the wireless power transmission and reception apparatuses of FIG. 1.

The wireless power transmission apparatus 100 according to the embodiment includes a first wireless power transmission module 110 and a second wireless transmission module 120. The wireless power reception apparatus 200 may be used in a mobile phone, a smartphone, a laptop, a digital broadcast terminal, a personal digital assistant (PDA), a portable multimedia player (PMP), a navigation system, an MP3 player, other small electronic apparatuses, etc. and embodiments are limited thereto and are applicable to any apparatus including a wireless power reception unit according to the present invention to charge a battery.

First, whether the wireless power reception apparatus 200 is provided in the wireless power transmission apparatus 100 is determined and the wireless power transmission apparatus 100 may transmit a first signal to the wireless power reception apparatus 200 (S110).

The wireless power transmission apparatus 100 includes the first wireless power transmission module 110, the second wireless power transmission module 120 and a DC/DC converter (not shown). A controller 150 may control operation of the wireless power transmission apparatus 100.

At this time, the first signal transmission unit 111 of the first wireless power transmission module 110 of the wireless power transmission apparatus 100 may transmit the first signal.

For example, the first wireless power transmission module 110 may wirelessly transmit power using a magnetic resonance method and, more particularly, an Alliance for Wireless Power (A4WP) method. At this time, the first signal may be a short beacon.

Impedance change caused by the first signal may be sensed to determine whether the wireless power reception apparatus 200 is provided (S120). For example, when the wireless power reception apparatus 200 is provided in the area of the first signal, impedance of the wireless power transmission apparatus 100 is changed by interaction between the wireless power reception apparatus 200 and the wireless power transmission apparatus 100. Thus, it is possible to determine whether the wireless power reception apparatus 200 is provided.

When it is determined that the wireless power reception apparatus 200 is not provided in the wireless power transmission apparatus 100 (No), the first signal may be retransmitted after a predetermined time.

That is, when it is determined that the wireless power reception apparatus 200 is provided (Yes), the second signal transmission unit 112 of the first wireless power transmission module 110 of the wireless power transmission apparatus 100 may transmit a second signal (S130) and determine whether the wireless power reception apparatus 200 is a terminal capable of wirelessly receiving power using a magnetic resonance method (S140). The second signal may be a long beacon, for example.

Whether the wireless power reception apparatus 200 is a terminal capable of wirelessly receiving power using the magnetic resonance method may be determined by receiving an advertisement (ADV) signal at the reception unit 125 of the first wireless power transmission module 110. For example, the second signal may function as a wake-up signal for transmitting power enabling the wireless power reception apparatus to transmit the ADV signal.

Here, since wireless power transmission of the magnetic resonance method has a wider charging area than that of wireless power transmission of the magnetic induction method, the terminal 200 is easily detected and a time required to start charging may be shortest.

Figure 3:
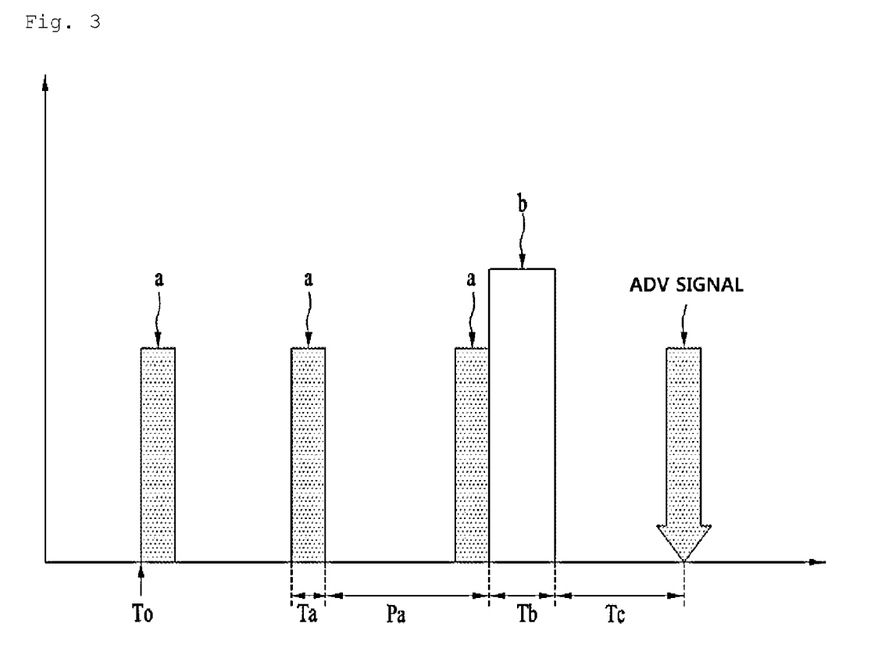
FIG. 3 is a diagram showing the waveforms of a short beacon and a long beacon.

FIG. 3 is a diagram showing the waveforms of a short beacon and a long beacon.

The short beacon a may be transmitted at a time $T_0$ of 50 milliseconds after the wireless power transmission apparatus is turned on and the duration Ta of the short beacon a may be 30 milliseconds or less and the period Pa of the short beacon a may be 250±5 milliseconds.

The duration Tb of the long beacon b may be 105±5 milliseconds and, although not shown, the period of the long beacon b is 850 milliseconds or more or 3,000 milliseconds or less.

In FIG. 3, an object such as the wireless power reception apparatus may be detected using the short beacon a, the long beacon b may be transmitted, and, when the wireless power reception apparatus may wirelessly receive power from the wireless power transmission apparatus, the advertisement (ADV) signal may be transmitted from the wireless power reception apparatus to the wireless power transmission apparatus within a predetermined time Tc after transmitting the long beacon b.

That is, it takes a time of Ta+Tb+Tc=465 milliseconds or less for the wireless power transmission apparatus to detect the object using the short beacon a, to transmit the long beacon b to identify whether wireless transmission/reception of power is possible, and to receive the ADV signal.

When it is determined that the wireless power reception apparatus 200 is a terminal capable of wirelessly receiving power using the magnetic resonance method (Yes), the first wireless power transmission module 110 of the wireless power transmission apparatus 100 may wirelessly transmit power using the magnetic resonance method, for example, the Alliance for Wireless Power (A4WP) method (S150).

Wireless power transmission and reception of the magnetic resonance method may be continued until the wireless power reception apparatus 200 is separated from the wireless power transmission apparatus 100 or until charging is completed (S160).

When it is determined that the wireless power reception apparatus 200 is not a terminal capable of wirelessly receiving power using the magnetic resonance method (No), the wireless power transmission apparatus 100 may wirelessly transmit power using another magnetic induction method such as Power Matters Alliance (PMA) or Wireless Power Consortium (WPC) (S145).

Hereinafter, an example in which the above-described apparatus wirelessly transmits and receives power will be described with reference to FIGS. 4 to 7.

Figure 4:
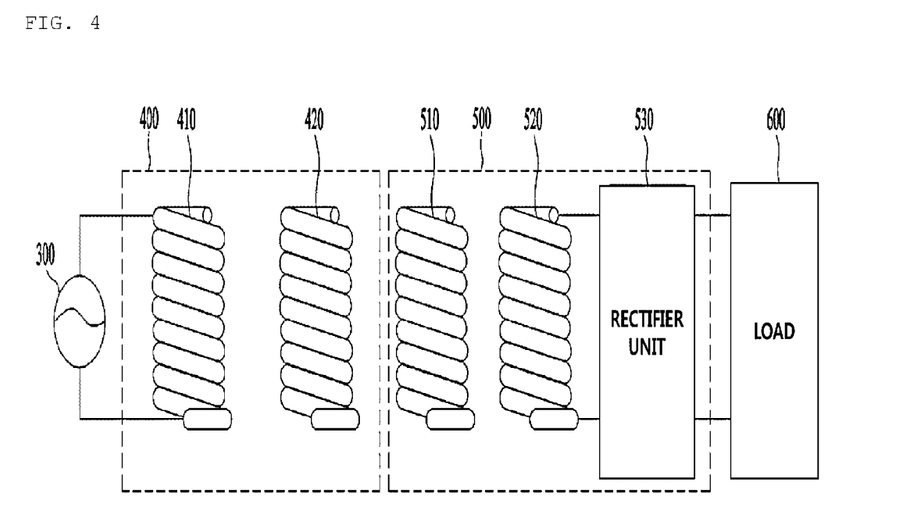
FIG. 4 is a diagram illustrating a wireless power transmission system according to an embodiment.
Figure 5:
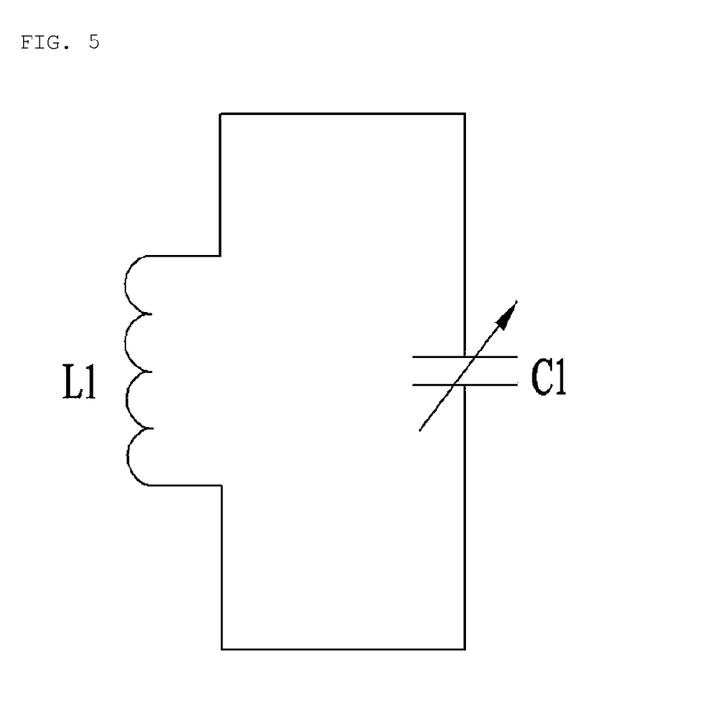
FIG. 5 is an equivalent circuit diagram of a transmission induction coil according to an embodiment.
Figure 6:
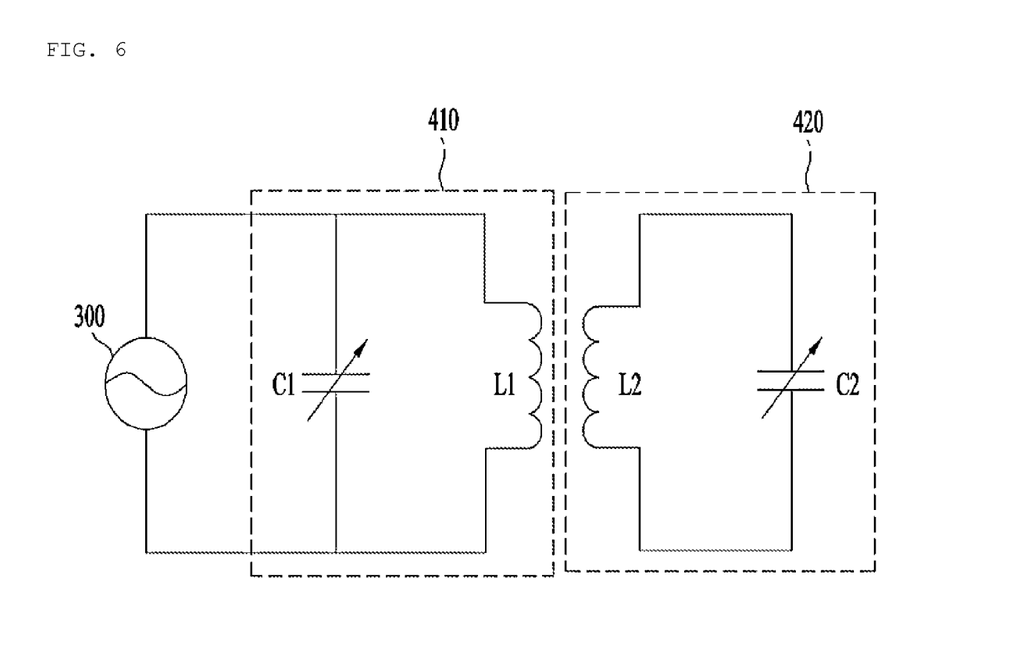
FIG. 6 is an equivalent circuit diagram of a power source and a wireless power transmission apparatus according to an embodiment.
Figure 7:
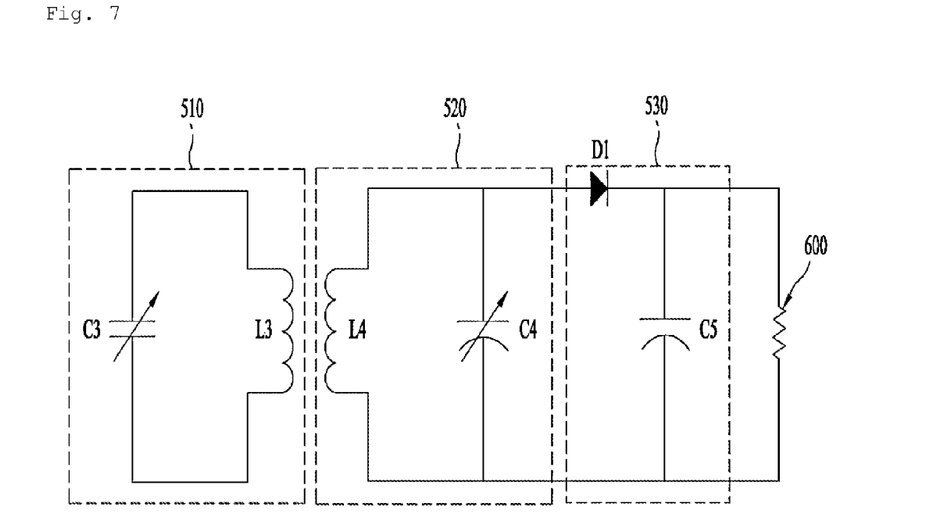
FIG. 7 is an equivalent circuit diagram of a wireless power reception apparatus according to an embodiment.

FIG. 4 is a diagram illustrating a wireless power transmission system according to an embodiment, FIG. 5 is an equivalent circuit diagram of a transmission induction coil according to an embodiment, FIG. 6 is an equivalent circuit diagram of a power source and a wireless power transmission apparatus according to an embodiment, and FIG. 7 is an equivalent circuit diagram of a wireless power reception apparatus according to an embodiment.

Referring to FIG. 4, the wireless power transmission system according to the embodiment may include a power source 300, a wireless power transmission apparatus 400, a wireless power reception apparatus 500 and a load 600.

Although the power source 300 may be included in the wireless power transmission apparatus 400 in the embodiment, the embodiment is not limited thereto.

The wireless power transmission apparatus 400 may include a transmission induction coil 410 and a transmission resonance coil 420 and the wireless power reception apparatus 500 may include a reception resonance coil 510, a reception induction coil 520 and a rectifier unit 530.

Both ends of the power source 300 may be connected to both ends of the transmission induction coil 410, the transmission resonance coil 420 may be provided at a predetermined distance from the transmission induction coil 410 and the reception resonance coil 510 may be provided at a predetermined distance from the reception induction coil 520.

Both ends of the reception induction coil 520 may be connected to both ends of the rectifier unit 530 and the load 600 may be connected to the rectifier unit 530. In the embodiment, the wireless power reception apparatus 500 may include the load 600.

Power generated by the power source 300 may be delivered to the wireless power transmission apparatus 400 and power delivered to the wireless power transmission apparatus 400 may be delivered to the wireless power reception apparatus 500 resonating with the wireless power transmission apparatus 400, that is, having the same resonance frequency value as the wireless power transmission apparatus, by a resonance phenomenon.

Hereinafter, a power transmission procedure will be described in greater detail.

The power source 300 may generate and deliver AC power having a predetermined frequency to the wireless power transmission apparatus 400.

The transmission induction coil 410 and the transmission resonance coil 420 may be inductively coupled. That is, AC current may be generated in the transmission induction coil 410 by AC power received from the power source 300 and AC current may be generated in the transmission resonance coil 420 physically separated therefrom by electromagnetic induction due to such AC current.

Thereafter, power delivered to the transmission resonance coil 420 may be delivered to the wireless power reception apparatus 500 having the same resonance frequency as the wireless power transmission apparatus 400 using the frequency resonance method.

Power may be transmitted between two impendence-matched LC circuits by resonance. Power transmission due to resonance delivers power over a longer distance with higher transmission efficiency, as compared to power transmission using the electromagnetic induction method.

The reception resonance coil 510 may receive power delivered from the transmission resonance coil 420 using the frequency resonance method. AC current may flow in the reception resonance coil 510 due to the received power and power delivered to the reception resonance coil 510 may be delivered to the reception induction coil 520 inductively coupled with the reception resonance coil 510 by electromagnetic induction. Power delivered to the reception induction coil 520 may be rectified by the rectifier unit 530 and delivered to the load 600.

In the embodiment, the transmission induction coil 410, the transmission resonance coil 420, the reception resonance coil 510 and the reception induction coil 520 may have one of a spiral or helical structure, without being limited thereto. In addition, the coil structure is not limited thereto and the coil may have an etched pattern structure on an FPCB, a PCB, etc.

The transmission resonance coil 420 and the reception resonance coil 510 may be resonantly coupled such that power is delivered at a resonance frequency.

By resonance coupling of the transmission resonance coil 420 and the reception resonance coil 510, power transmission efficiency between the wireless power transmission apparatus 400 and the wireless power reception apparatus 500 may be significantly improved.

The wireless power transmission system for delivering power using the resonance frequency method was described above.

The embodiment is applicable to power delivery using the electromagnetic induction method, in addition to the resonance frequency method.

That is, in the embodiment, when the wireless power transmission system performs power transmission based on electromagnetic induction, the transmission resonance coil 420 included in the wireless power transmission apparatus 400 and the reception resonance coil 510 included in the wireless power reception apparatus 500 may be omitted.

FIG. 5 is an equivalent circuit diagram of a transmission induction coil according to an embodiment.

As shown in FIG. 5, the transmission induction coil 410 may include an inductor L1 and a capacitor C1 to configure a circuit having appropriate inductance and capacitance values.

Both ends of the inductor L1 are connected to both ends of the capacitor C1 in the transmission induction coil 410. That is, the inductor L1 and the capacitor C1 are connected in parallel in the transmission induction coil 410.

The capacitor C1 may be a variable capacitor and impedance matching may be performed by adjusting capacitance of the capacitor C1. The equivalent circuits of the transmission resonance coil 420, the reception resonance coil 510 and the reception induction coil 520 may be equal or similar to those shown in FIG. 5, without being limited thereto.

FIG. 6 is an equivalent circuit diagram of a power source and a wireless power transmission apparatus according to an embodiment.

As shown in FIG. 6, the transmission induction coil 410 and the transmission resonance coil 420 respectively include inductors L1 and L2 and capacitors C1 and C2 having respective inductance values and respective capacitance values.

FIG. 7 is an equivalent circuit diagram of a wireless power reception apparatus according to an embodiment.

As shown in FIG. 7, the reception resonance coil 510 and the reception induction coil 520 respectively include inductors L3 and L4 and capacitors C3 and C4 having respective inductance values and respective capacitance values.

The rectifier unit 530 may convert AC power received from the reception induction coil 520 into DC power and deliver the converted DC power to the load 600.

More specifically, the rectifier unit 530 may include a rectifier and a smoothing circuit, although not shown. In the embodiment, a silicon rectifier may be used as the rectifier and may be equivalent to a diode D1 as shown in FIG. 7, without being limited thereto.

The rectifier unit 530 may convert AC power received from the reception induction coil 520 into DC power.

The smoothing circuit may eliminate the AC component included in the DC power converted by the rectifier and output smooth DC power. In the embodiment, a rectification capacitor C5 may be used as the smoothing circuit as shown in FIG. 7, without being limited thereto.

DC power delivered from the rectifier unit 530 may be DC voltage or DC current, without being limited thereto.

The load 600 may be any battery or apparatus requiring DC power. For example, the load 600 may be a battery.

The wireless power reception apparatus 500 may be installed in an electronic apparatus requiring power, such as a mobile phone, a laptop, a mouse, etc. and the reception resonance coil 510 and the reception induction coil 520 may have different shapes according to electronic apparatuses.

The wireless power transmission apparatus 400 may exchange information with the wireless power reception apparatus 500 using in-band or out-of-band communication.

In-band communication may mean communication for exchanging information between the wireless power transmission apparatus 400 and the wireless power reception apparatus 500 using a signal having a frequency used for wireless power transmission. The wireless power reception apparatus 500 may further include a switch and may or may not receive power transmitted by the wireless power transmission apparatus 400 via switching operation of the switch. Thus, the wireless power transmission apparatus 400 may detect the amount of power consumed in the wireless power transmission apparatus 500 and recognize the ON or OFF signal of the switch included in the wireless power reception apparatus 500.

More specifically, the wireless power reception apparatus 500 may change the amount of power absorbed in a resistor using a resistor element and the switch to change the amount of power consumed in the wireless power transmission apparatus 400. The wireless power transmission apparatus 400 may detect change in power consumption to acquire state information of the load 600. The switch and the resistor element may be connected in series. In the embodiment, the state information of the load 600 may include information on a current charging amount and charging amount trend data. The load 600 may be included in the wireless power reception apparatus 300.

More specifically, when the switch is opened, power absorbed in the resistor element is 0 and power consumed in the wireless power transmission apparatus 400 decreases.

When the switch is closed, power absorbed in the resistor element becomes greater than 0 and power consumed in the wireless power transmission apparatus 400 increases. When such operation is repeated in the wireless power reception apparatus, the wireless power transmission apparatus 400 may detect power consumed in the wireless power transmission apparatus 400 to perform digital communication with the wireless power reception apparatus 500.

The wireless power transmission apparatus 400 may receive the state information of the load 600 according to the above-described operation and transmit power suitable therefor.

In contrast, a resistor element and a switch may be included in the wireless power transmission apparatus 400 to transmit the state information of the wireless power transmission apparatus 400 to the wireless power reception apparatus 500. In the embodiment, the state information of the wireless power transmission apparatus 400 may include information on a maximum amount of power supplied by the wireless power transmission apparatus 400, the number of wireless power reception apparatuses 500, to which the wireless power transmission apparatus 400 supplies power, and an available power amount of the wireless power transmission apparatus 400.

Next, out-of-band communication will be described.

Out-of-band communication refers to communication for exchanging information necessary for power transmission using a frequency band other than a resonance frequency band. Out-of-band communication modules may be provided in the wireless power transmission apparatus 400 and the wireless power reception apparatus 500 to exchange information necessary for power transmission therebetween. The out-of-band communication module may be mounted in the power source 300, without being limited thereto. In the embodiment, the out-of-band communication module may use a short-range communication method such as ZigBee, wireless local area network (LAN), near field communication (NFC) or Bluetooth low energy (BLE), without being limited thereto.

Figure 8:
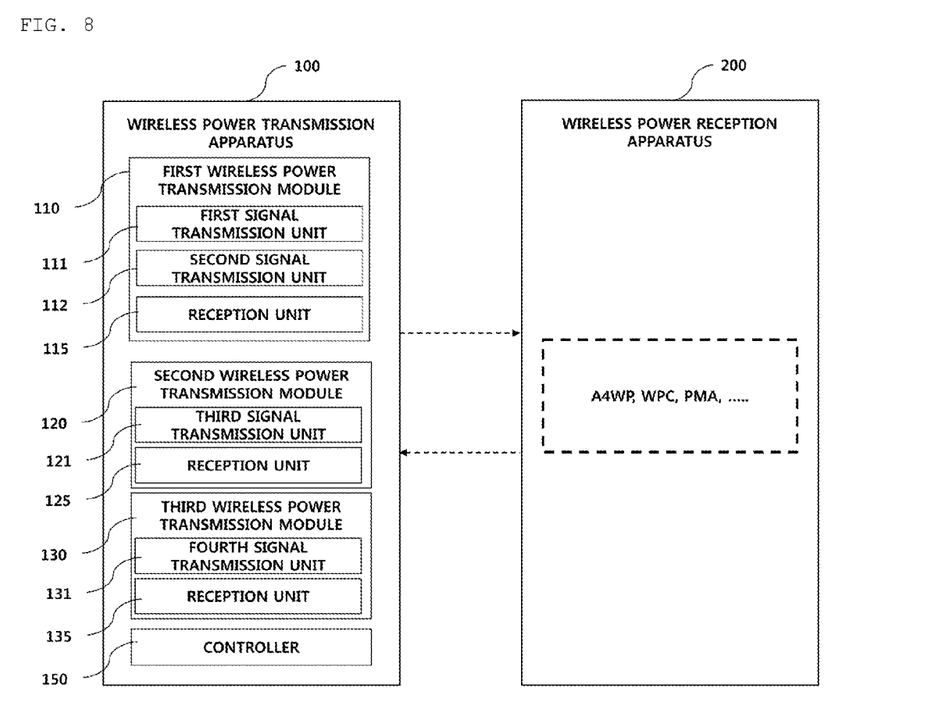
FIG. 8 is a diagram showing a second embodiment of wireless power transmission and reception apparatuses.
Figure 9:
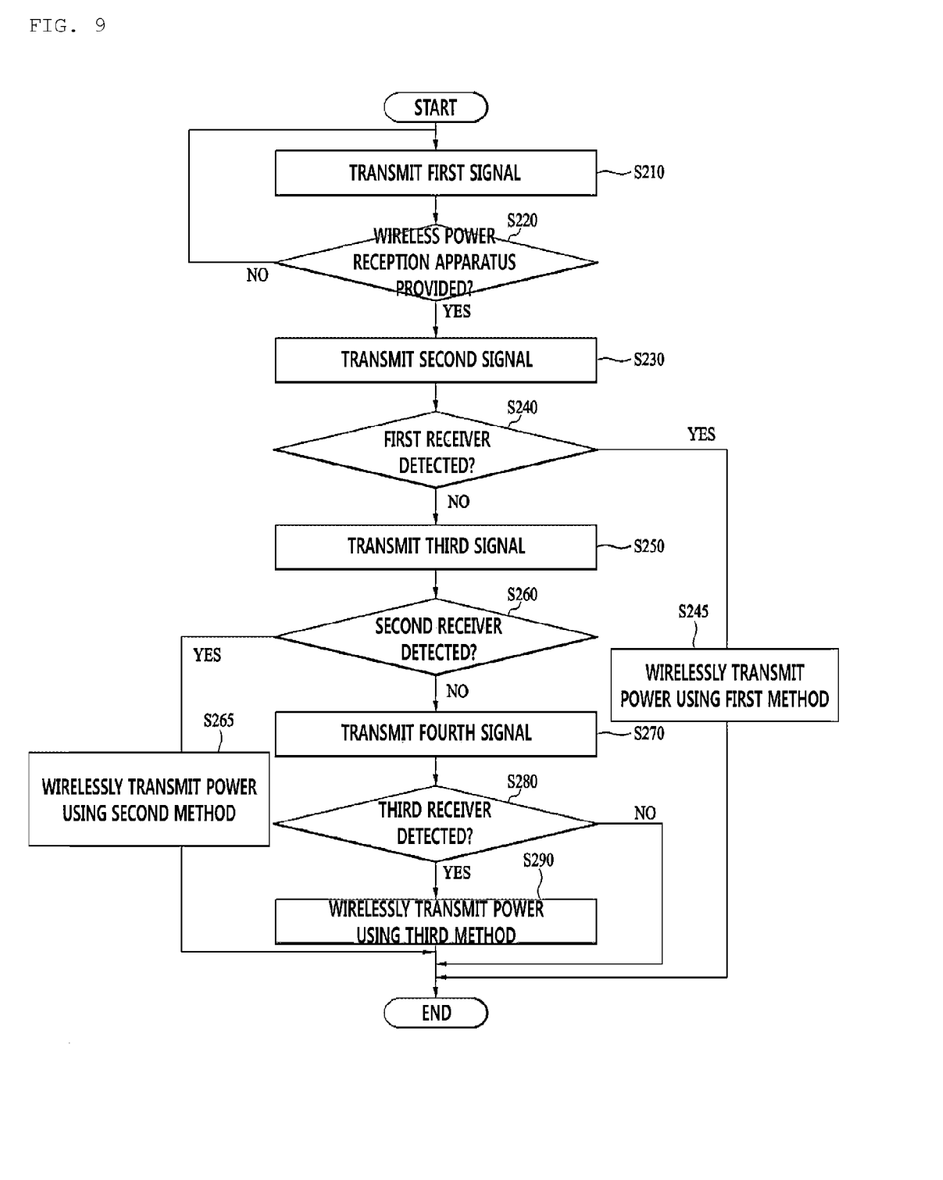
FIG. 9 is a flowchart illustrating wireless power transmission and reception executed in the wireless power transmission and reception apparatuses of FIG. 8.

FIG. 8 is a diagram showing a second embodiment of a wireless power transmission and reception apparatuses, and FIG. 9 is a flowchart illustrating wireless power transmission and reception executed in the wireless power transmission and reception apparatuses of FIG. 8.

The wireless power transmission apparatus 100 according to the present embodiment may include a first wireless power transmission module 110, a second wireless power transmission module 120, a third wireless power transmission module 130, a controller 150, and a DC/DC converter (not shown). The wireless power reception apparatus 200 may be charged using a wireless power reception unit mounted therein and equal to that shown in FIG. 1 and may wirelessly receive power using at least one of the A4WP, WPC and PMA methods.

First, whether the wireless power reception apparatus 200 is provided in the wireless power transmission apparatus 100 is determined and the wireless power transmission apparatus 100 may transmit a first signal to the wireless power reception apparatus 200 (S210).

A first signal transmission unit 111 of a first wireless power transmission module 110 of the wireless power transmission apparatus 100 may transmit the first signal. For example, the first wireless power transmission module 110 may wirelessly transmit power using the magnetic resonance method and, more particularly, the A4WP method. At this time, the first signal may be a short beacon.

Whether the wireless power reception apparatus 200 is provided is determined via impedance change caused by the first signal (S220). When it is determined that the wireless power reception apparatus 200 is not provided in the wireless power transmission apparatus 100 (No), the first signal may be retransmitted after a predetermined time.

When it is determined that the wireless power reception apparatus 200 is provided (Yes), a second signal transmission unit 112 of a first wireless power transmission module 110 of the wireless power transmission apparatus 100 may transmit a second signal (S230) and determine whether the wireless power reception apparatus 200 includes a first receiver (S240). In this step, whether the wireless power reception apparatus 200 is a terminal capable of wirelessly receiving power using a first method, for example, a magnetic resonance method may be determined. The second signal may be a long beacon, for example.

Whether the wireless power reception apparatus 200 is a terminal capable of wirelessly receiving power using the magnetic resonance method may be determined by receiving an ADV signal at the reception unit 115 of the first wireless power transmission module 110.

The waveforms of the short beacon and the long beacon were described with reference to FIG. 3.

When it is determined that the wireless power reception apparatus 200 includes the first receiver, that is, when it is determined that the wireless power reception apparatus 200 is a terminal capable of wirelessly receiving power using the first method (Yes), the first wireless power transmission module 110 of the wireless power transmission apparatus 100 may wirelessly transmit power using the first method (S245). The first method may be a magnetic resonance method, for example, and, more particularly, an A4WP method.

When it is determined that the wireless power reception apparatus 200 is not a terminal capable of wirelessly receiving power using the first method (No), the wireless power transmission apparatus 100 may wirelessly transmit power using another method, for example, a magnetic induction method and, more particularly, a PMA or WPC method.

A third signal transmission unit 121 of the second wireless power transmission module 120 may transmit a third signal (S250). At this time, the third signal may be a digital ping. When power is wirelessly transmitted using the PMA or WPC method, the analog ping is transmitted to determine whether the terminal approaches the wireless power transmission apparatus. In the present embodiment, since approach of the terminal is determined by transmitting the first signal, transmission of the analog ping may be omitted.

Whether the wireless power reception apparatus 200 includes a second receiver is determined (S260). This step is performed by, at the reception unit 125, receiving a specific signal from the wireless power reception apparatus 200 after the second wireless power transmission module 120 transmits the digital ping.

Figure 10:
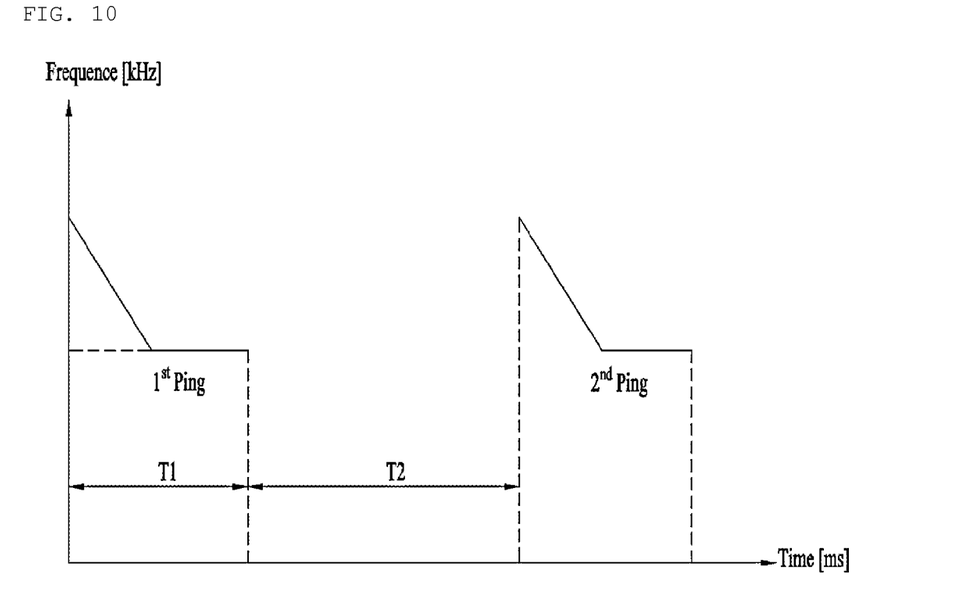
FIG. 10 is a diagram showing the waveform of a digital ping of a Power Matters Alliance (PMA) method.

FIG. 10 is a diagram showing the waveform of a digital ping of a Power Matters Alliance (PMA) method. The duration T1 of the digital ping may be 26 milliseconds to 28 milliseconds and a gap T2 from end of a first digital ping to start of a second digital ping may be 30 milliseconds to 300 milliseconds.

For example, when a total of five digital pings is transmitted, the duration T1 of each of the five digital pings is 26 milliseconds and each of five gaps T2 is 30 milliseconds. Thus, at least a total of 280 milliseconds may be consumed.

When the wireless power reception apparatus 200 includes the second receiver, that is, when it is determined that the wireless power reception apparatus 200 is a terminal capable of wirelessly receiving power using the second method (Yes), the second wireless power transmission module 120 of the wireless power transmission apparatus 100 may wirelessly transmit power using the second method (S265). The second method may be a magnetic induction method, for example, and, more particularly, a PMA method.

At this time, the second receiver is identified when charging starts and 35 milliseconds may be taken until power transmission starts. Accordingly, 315 milliseconds may be taken from transmission of the digital ping to determination as to whether the second receiver is included. When the second receiver is not detected, 280 milliseconds may be taken.

When it is determined that the wireless power reception apparatus 200 is not a terminal capable of wirelessly receiving power using the second method (No), the wireless power transmission apparatus 100 may wirelessly transmit power using another method, for example, a WPC method.

A third signal transmission unit 131 of a third wireless power transmission module 130 transmits a fourth signal (S270) and whether the wireless power reception apparatus 200 includes a third receiver is determined (S280).

When power is wirelessly transmitted using the WPC method, transmission of the analog ping may be omitted, a digital ping may be transmitted as the fourth signal, and whether the wireless power reception apparatus 200 includes a third receiver may be determined.

After the third wireless power transmission module 130 transmits the digital ping, the reception unit 135 may receive a specific signal from the wireless power reception apparatus 200.

Figure 11:
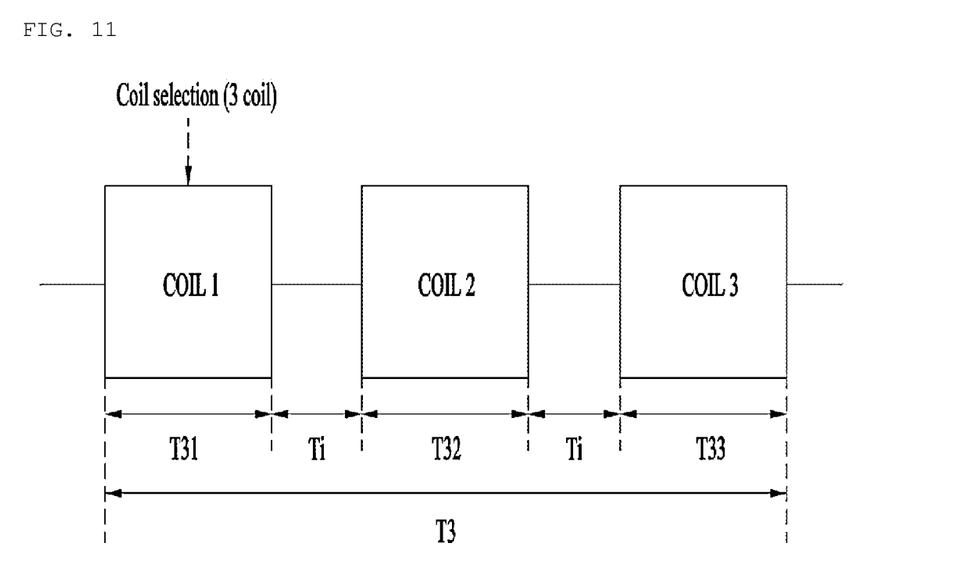
FIG. 11 is a diagram showing the waveform of a digital ping of a Wireless Power Consortium (WPC) method.

FIG. 11 is a diagram showing the waveform of a digital ping of a Wireless Power Consortium (WPC) method.

When the digital ping is transmitted using three coils, each of a duration T31 of a first coil 1, a duration T32 of a second coil 2 and a duration T33 of a third coil 3 may be 70 milliseconds and a gap Ti between the coils may be 28 milliseconds.

When a total of three digital pings is transmitted, at least a total of 266 milliseconds is taken.

When the wireless power reception apparatus 200 includes the third receiver, that is, when it is determined that there is a terminal capable of wirelessly receiving power using a third method (Yes), the third wireless power transmission module 130 of the wireless power transmission apparatus 100 may wirelessly transmit power using the third method (S290). The third method may be a WPC method, for example.

At this time, it takes a total of 1899 milliseconds to transmit a total of three digital pings, to identify the third receiver and to start power transmission.

In the present embodiment, it takes a total of 465 milliseconds for the wireless power transmission apparatus to transmit the first signal and to determine that the wireless power reception apparatus is not the first receiver, it takes a total of 280 milliseconds to transmit the second signal and to determine that the wireless power reception apparatus is not the second receiver, and it takes a total of 1899 milliseconds to transmit the third signal, to determine that the wireless power reception apparatus is the third receiver and to start wireless power transmission. Therefore, it takes a total of 2644 milliseconds from transmission of the first signal to wireless transmission of power using the third method, that is, the WPC method.

In the wireless power transmission apparatus and method of the present embodiment, the wireless power transmission modules of three different methods such as A4WP, PMA and WPC methods are provided in one wireless power transmission apparatus. Since wireless power transmission of the magnetic resonance method has a wider charging area than that of wireless power transmission of the magnetic induction method, the terminal is easily sensed and a time required to start charging may be shortest. First, charging may be attempted using the A4WP method and then attempted using the PMA and WPC methods which are magnetic induction methods.

When the wireless power reception method of a terminal is unknown, whether wireless power reception may be performed using the A4WP, PMA and WPC methods may be sequentially determined. Therefore, it takes a total of less than 3 seconds until wireless power transmission starts.

Although embodiments have been described with reference to a number of illustrative embodiments thereof, it should be understood that numerous other modifications and embodiments can be devised by those skilled in the art without departing from the fundamental properties of the present embodiments.

For example, various modifications are possible in the components of the embodiments. Differences related to such modifications and applications are interpreted as within the scope of this disclosure defined in the appended claims.

What is claimed is:

1. A wireless power transmission apparatus for wirelessly transmitting power to a wireless power reception apparatus, the wireless power transmission apparatus comprising:
   a first wireless power transmission module configured to wirelessly transmit power using a first method;
   a second wireless power transmission module configured to wirelessly transmit power using a second method; and
   a controller configured to control the first wireless power transmission module and the second wireless power transmission module,
   wherein the first wireless power transmission module includes a first signal transmission unit configured to transmit a first signal for detecting the wireless power reception apparatus, a second signal transmission unit configured to transmit a second signal for determining whether the detected wireless power reception apparatus is capable of receiving power transmitted using the first method and a reception unit configured to receive a signal from the wireless power reception apparatus.

2. The wireless power transmission apparatus according to claim 1, wherein the first method is a magnetic resonance method.

3. The wireless power transmission apparatus according to claim 1, wherein the second method is a magnetic induction resonance method.

4. The wireless power transmission apparatus according to claim 1, wherein the first signal transmission unit transmits a short beacon and the second signal transmission unit transmits a long beacon.

5. The wireless power transmission apparatus according to claim 1, wherein the reception unit receives an advertisement (ADV) signal and determines whether the wireless power reception apparatus is a terminal capable of wirelessly receiving power using the first method.

6. The wireless power transmission apparatus according to claim 1, wherein the second wireless power transmission module includes a third signal transmission unit configured to transmit a third signal for detecting the wireless power reception apparatus, and the third signal transmission unit transmits a digital ping.

7. The wireless power transmission apparatus according to claim 1, further comprising a third wireless power transmission module configured to wirelessly transmit power using a third method,
wherein the third wireless power transmission module includes a fourth signal transmission unit configured to transmit a fourth signal for detecting the wireless power reception apparatus.

8. The wireless power transmission apparatus according to claim 7, wherein the second method is a Power Matters Alliance (PMA) method and the third method is a Wireless Power Consortium (WPC) method.

9. A wireless power transmission method for wirelessly transmitting power, the wireless power transmission method comprising:
transmitting a first signal in order to detect a wireless power reception apparatus;
transmitting a second signal for determining whether the wireless power reception apparatus uses a first method; and
transmitting a third signal for determining whether the wireless power reception apparatus uses a second method, when the wireless power reception apparatus does not use the first method.

10. The wireless power transmission method according to claim 9, further comprising wirelessly transmitting power using a second method, when the wireless power reception apparatus uses the second method.

11. The wireless power transmission method according to claim 9, further comprising transmitting a fourth signal for determining whether the wireless power reception apparatus uses a third method, when the wireless power reception apparatus does not use the second method.

12. The wireless power transmission method according to claim 11, further comprising wirelessly transmitting power using the third method when the wireless power reception apparatus uses the third method.

13. The wireless power transmission method according to claim 12, wherein less than 3 seconds is taken from transmitting of the first signal to transmitting power using at least one of the first method, the second method or the third method.

14. The wireless power transmission method according to claim 11, wherein the third signal and the fourth signal are a digital ping.

15. The wireless power transmission method according to claim 14, wherein the first method is an Alliance for Wireless Power (A4WP) method and the second method is at least one of a Power Matters Alliance (PMA) method or a Wireless Power Consortium (WPC) method.

16. The wireless power transmission method according to claim 11, wherein the third method is a Wireless Power Consortium (WPC) method.

17. The wireless power transmission method according to claim 9, wherein the first signal is a short beacon and the second signal is a long beacon.

18. The wireless power transmission method according to claim 9, further comprising receiving an advertisement (ADV) signal to determine whether the wireless power reception apparatus wirelessly receives power using the first method.

19. The wireless power transmission method according to claim 9, wherein the first method is a magnetic resonance method and the second method is a magnetic induction resonance method.

20. The wireless power transmission method according to claim 9, wherein the wireless power transmission method using the first method has a wider charging area than that of the wireless power transmission method using the second method.

* * * * *